United States Patent
Kim et al.

(10) Patent No.: US 10,621,949 B2
(45) Date of Patent: Apr. 14, 2020

(54) METHOD OF COLOR GRADING AND COLOR CORRECTION, AND APPARATUS FOR COLOR GRADING AND COLOR CORRECTION USING THE SAME

(71) Applicant: HANCOM, INC., Seongnam-si, Gyeonggi-do (KR)

(72) Inventors: Ki Hong Kim, Namyangju-si (KR); Sang Tae Myong, Seongnam-si (KR)

(73) Assignee: HANCOM, INC., Seongnam-si, Gyeonggi-do (KR)

( * ) Notice: Subject to any disclaimer, the term of this patent is extended or adjusted under 35 U.S.C. 154(b) by 0 days.

(21) Appl. No.: 16/175,872

(22) Filed: Oct. 31, 2018

(65) Prior Publication Data
US 2019/0130870 A1 May 2, 2019

(30) Foreign Application Priority Data
Oct. 31, 2017 (KR) .......................... 10-2017-0143556

(51) Int. Cl.
G09G 5/06 (2006.01)
G09G 5/04 (2006.01)
G01J 3/52 (2006.01)
G09G 5/02 (2006.01)

(52) U.S. Cl.
CPC .................. G09G 5/06 (2013.01); G01J 3/52 (2013.01); G09G 5/026 (2013.01); G09G 5/04 (2013.01); G09G 2340/06 (2013.01)

(58) Field of Classification Search
CPC .... G09G 5/02; G09G 5/06; G09G 2320/0666; G09G 2320/0626; G09G 5/346; G09G 2360/16; G06T 11/001; H04N 1/6058
See application file for complete search history.

(56) References Cited

U.S. PATENT DOCUMENTS

| 2005/0128495 | A1* | 6/2005 | Arai | H04N 1/6019 358/1.9 |
|---|---|---|---|---|
| 2009/0102777 | A1* | 4/2009 | Izumikawa | G09G 3/3614 345/96 |
| 2016/0150145 | A1* | 5/2016 | Van Der Vleuten | H04N 5/2355 348/234 |
| 2017/0374394 | A1* | 12/2017 | Turner | G11B 27/031 |

FOREIGN PATENT DOCUMENTS

KR       10-1695224 B1       1/2017

* cited by examiner

Primary Examiner — Todd Buttram
(74) Attorney, Agent, or Firm — Revolution IP, PLLC

(57) ABSTRACT

A method of color grading and color correction, the method includes: generating data of image processing results obtained by performing various types of color grading and color correction in a profile form, and storing the same; and applying the image processing result to a target image by using profile information of color grading and color correction selected from the stored profiles.

14 Claims, 8 Drawing Sheets

FIG. 7A
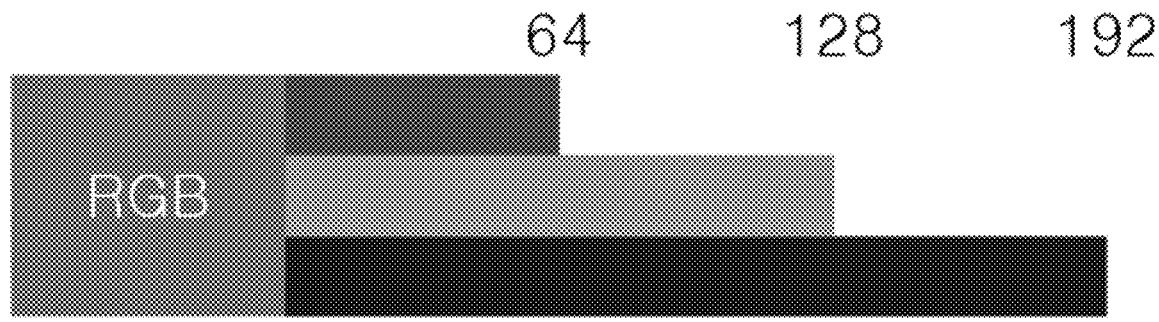
R:64/G:128/B:192
FIG. 7B
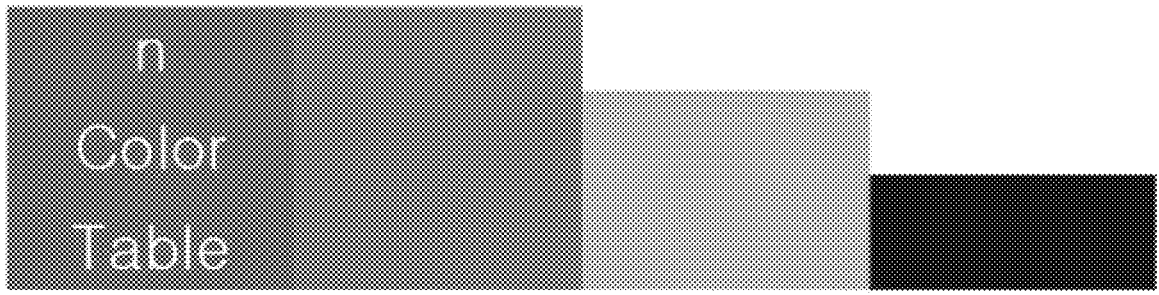
RGB:64/GB:128-64/B:192-128
FIG. 8
| RGB | RG | GB | RB | R | G | B |
|-----|----|----|----|----|----|----|
|     |    |    |    |    |    |    |

| CMYK | CMY | CMK | CYK | MYK | CM | CY |
|------|-----|-----|-----|-----|----|----|
| CK | MY | MK | YK | C | M | Y |
| K | | | | | | |

RGB

METHOD OF COLOR GRADING AND COLOR CORRECTION, AND APPARATUS FOR COLOR GRADING AND COLOR CORRECTION USING THE SAME

CROSS REFERENCE TO RELATED APPLICATION

The present application claims priority to Korean Patent Application No. 10-2017-0143556, filed Oct. 31, 2017, the entire contents of which is incorporated herein for all purposes by this reference.

BACKGROUND OF THE INVENTION

Field of the Invention

The present invention relates generally to a color grading and color correction method and a color grading and color correction apparatus using the same. More particularly, the present invention relates to a color grading and color correction method and a color grading and color correction apparatus using the same in terms wherein a combined color component that becomes a practical subject to be adjusted represents a color rather than uniformly performing color changing on the basis of a color component.

Description of the Related Art

Image processing or picture processing refers to all types of information processing using an image as an input and output, and is a representative example of processing photos or videos. As a general image processing method, a signaling processing method is applied to an image by handling the same as a two-dimensional signal.

Among image processing methods, for color correction such as brightness, contrast, etc. and for color mapping, color matching, quantization, or color conversion to another color space, various image processing functions are present for a digital image such as digital photo captured by a digital camera. In addition, such image processing functions may be implemented by using various types of image retouching applications.

However, according to a conventional method, in order to obtain various effects by performing retouching to a color of a digital image, for example, in order to change parameters of brightness, contrast, level, curve, balance, tone, chroma, etc., complex calculation is required. In addition, a long time for image processing is required as a number of image processing types increases in association with an effect to be obtained by image processing. In addition, changing color information of an original image occurs as a number of image processing times increases. Further, due to a result of image processing that provides poor quality in terms of color, and resolution compared with the original image, users often select a revert button to cancel the image processing.

FIG. 1 is a view of an example showing an image color correction method used in a conventional method.

Referring to FIG. 1, in an RGB color model, a color represented as (R: 216, G: 109, B: 53) and a color represented as (R: 216, G: 220, B: 249) are distinguished from each. The former is a color close to a so-called brick color, and the latter is a color close to a light purple. However, when an R component has to be adjusted to decrease a red tone represented in a digital photo, according to a conventional method, image processing is performed by uniformly decreasing a value of the R component for each pixel of the digital photo. In addition, when adjusting a color component, a result that a color of other tones is adjusted occurs in addition to an effect of visually decreasing a red tone. Referring to FIG. 1, by the result of the conventional method, the light purple color becomes corrected in addition to the brick color having a red tone according to the R component correction.

First, a prior document of Korean Patent No. 10-1695224 (Jan. 5, 2017) discloses an image forming apparatus, a color correction method thereof, and a host apparatus for performing color correction for an output image by using the same.

In the prior document, a method is disclosed where colors between a display screen and a printing output are reconciled by using an image foaming apparatus regardless of a state of a display device. However, there is not disclosed where color correction is performed on the basis of a combined component formed by combining color components which is to be introduced in the present invention rather than using a single color component in a color model.

A method provided according to an embodiment of the present invention is a method of performing color correction by using a combine color component that becomes a practical subject to be adjusted, and is a method for solving the above problem differing from the above described prior method.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide a color grading and color correction method and a color grading and color correction apparatus using the same, the method and apparatus being capable of performing color grading and color correction in terms wherein a combined color component that becomes a practical target to be corrected represents a color rather than uniformly performing color changing on the basis of a color component.

Another object of the present invention is to provide a color grading and color correction method and a color grading and color correction apparatus using the same, the method and apparatus being capable of providing complex effect using a single process by redeeming a conventional method that sequentially performs each image processing in association with an effect so as to provide various effects.

Still another object of the present invention is to provide a color grading and color correction method and a color grading and color correction apparatus using the same, the method and apparatus being capable of reconstructing an effect to be implemented through color grading and color correction by storing in a database results of image processing providing various effects, selecting a desired effect by searching for the same in the database and performing the same, and quantifying the effect to be implemented.

Still another object of the present invention is to provide a color grading and color correction method and a color grading and color correction apparatus using the same, the method and apparatus being capable of obtaining various effect by using a single process and preventing corruption of color information so as to prevent damage to color information due to a number of image processing times performed to reconstruct various effects according to a conventional method.

In order to achieve the above object, according to one aspect of the present invention, there is provided a method of color grading and color correction, the method including: generating data of image processing results obtained by performing various types of color grading and color correction in a profile form, and storing the same; and applying the image processing result to a target image by using profile information of color grading and color correction selected among the stored profile.

Herein, representing a color value may be performed by using a combined component generated by combining color components according to a color model based on a greatest common divisor principle.

Herein, the generating of the data may include generating an n color table chart (NCTC) corresponding to a look-up table including the color value represented by using the combined component.

Herein, the generating of the data and storing the same may further include: applying image processing of color grading and color correction to a sample image; generating a profile of a color value of an image transformed by the image processing; and establishing a database of the types of the color grading and color correction, and profile information in association thereto.

Herein, the profile information may include a color value transformed by a color value of the NCTC and by the image processing.

Herein, the applying to the target image may include: changing a color value of the target image such that the color value of the target image is represented by using the combined component; searching in the database for a profile in association with the selected color grading and color correction that is to be applied to the target image and which is generated and stored as the data; and obtaining the target image to which the selected color grading and color correction is applied by transforming the color value of the target image according to profile information of the found profile.

Herein, in the representing of the color value, a color of an image pixel may be represented by using a combined component obtained by combining a plurality of color components, and a color component that is remained afterward.

Herein, the combination may be performed by combining from each other color components having a color value of a common numeral range in each color component.

Herein, the color value of the combination component may be represented in a color model including an RGB color model and a CMYK color model.

An apparatus for image grading and image processing according to one embodiment of the present invention includes: a database generating unit generating data of image processing results obtained by performing various types of color grading and color correction in a profile form, and storing the same; and a color correction engine applying the image processing result to a target image by using profile information of color grading and color correction selected among the stored profile.

Herein, the database generating unit may include a chart generating module generating an n color table chart (NCTC) corresponding to a look-up table including the color value represented by using the combined component.

Herein, the database generating unit may include: a demonstration module applying image processing of color grading and color correction to a sample image; a profile generating module generating a profile of a color value of an image transformed by the image processing; and a database module establishing a database of the types of color grading and color correction, and profile information in association thereto.

Herein, the profile information may include a color value transformed by a color value of the NCTC and by the image processing.

Herein, the color correction engine may include: a color change module changing a color value of the target image such that the color value of the target image is represented by using the combined component; a search module searching in the database for a profile in association with the selected color grading and color correction that is to be applied to the target image and which is generated and stored therein; and a color transform module obtaining the target image to which the selected color grading and color correction is applied by transforming the color value of the target image according to profile information of the found profile.

Herein, in the representing of the color value, a color of an image pixel may be represented by using a combined component obtained by combining a plurality of color components, and a color component that remains afterward.

Herein, the combination may be performed by combining from each other color components having a color value of a common numeral range in each color component.

Herein, the color value of the combination component may be represented in a color model including a RGB color model and a CMYK color model.

Herein, the chart generating module generates seven charts may be used: for an RGB combined component in which three color components of an R component, a G component, and a B component are combined; for an RG combined component, a GB combined component, and a BR combined component in which two color components are combined; and for each color component of a red component, a green component, and a blue component.

Herein, the chart generating module may generate 15 charts are used: for a CMYK combined component in which four color components of C, M, Y, and K components are combined; for CMY, CMK, CYK, and MYK combined components in which three color components are combined; for CM, CY, CK, MY, MK, and YK combined components in which two color components are combined; and for each color component of a cyan component, a magenta component, a yellow component, and a black component.

Herein, each chart may include 256 patches stepwisely representing a color according to a value of a color component constituting a combined component in association with each chart.

Herein, each chart may include 100 patches stepwisely representing a color according to a value of a color component constituting a combined component in association with each chart.

Herein, the color change module may transform the color value of the target image by adding at least one color value from a group including a transformed color value by an RGB combined component, a transformed color value by any one of RG, GB, and BR combined components, and a transformed color value by any one of remaining red, green, and blue components.

Herein, the target image may be a file having a format in which color information is not changed by the image processing.

According to the present invention, a combined color that becomes a practical subject to be adjusted can be provided by combining color components rather than using a color component according to a color model, and color grading and color correction can be performed on the basis of the combined color component.

In addition, color grading and color correction providing a complex effect can be performed by using a single process.

In addition, results of image processing providing various effects are stored in a database, a desired effect is selected and executed by searching for the same in the database, and thus the effect to be implemented can be reconstructed by performing color grading and color correction by quantifying the same.

In addition, various effects can be provided by using a single process and damage to color information may be prevented.

BRIEF DESCRIPTION OF THE DRAWINGS

The above and other objects, features and other advantages of the present invention will be more clearly understood from the following detailed description when taken in conjunction with the accompanying drawings, in which:

FIGS. 7A and 7B are views of an example showing a combination component of an RGB model according to an embodiment of the present invention;

FIG. 8 is a view of an n color table chart of an RGB model according to an embodiment of the present invention;

DETAILED DESCRIPTION OF THE INVENTION

Figure 1:
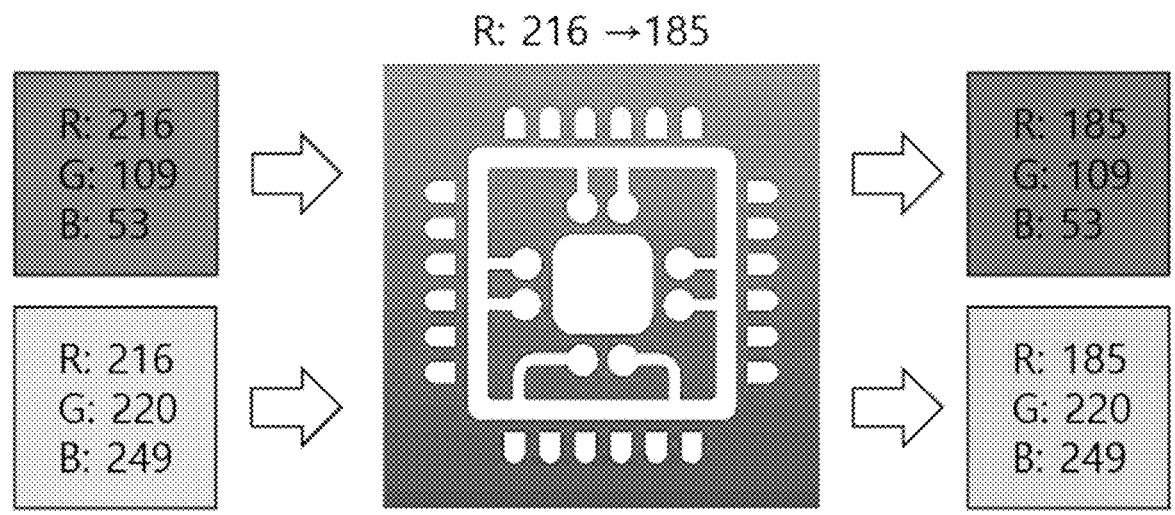
FIG. 1 is a view of an example showing a color correction method performed as a conventional method.

Hereinafter, a preferred embodiment of a color grading and color correction method and a color grading and color correction apparatus using the same will be described with reference to accompanied drawings. Like reference symbols in the drawings denote like elements. In addition, structural or functional descriptions, which are specified with reference to embodiments according to the inventive concept set forth herein are merely provided to describe embodiments of the inventive concept, and unless otherwise defined, all terms used herein including technical or scientific terms have the same meanings generally understood by one of ordinary skill in the art. Terms as defined in dictionaries generally used should be understood as having meaning identical to meaning contextually defined in the art and should not be understood as having an ideally or excessively formal meaning unless specifically defined herein.

Hereinafter, a color grading and color correction apparatus according to an embodiment of the present invention will be described.

Figure 2:
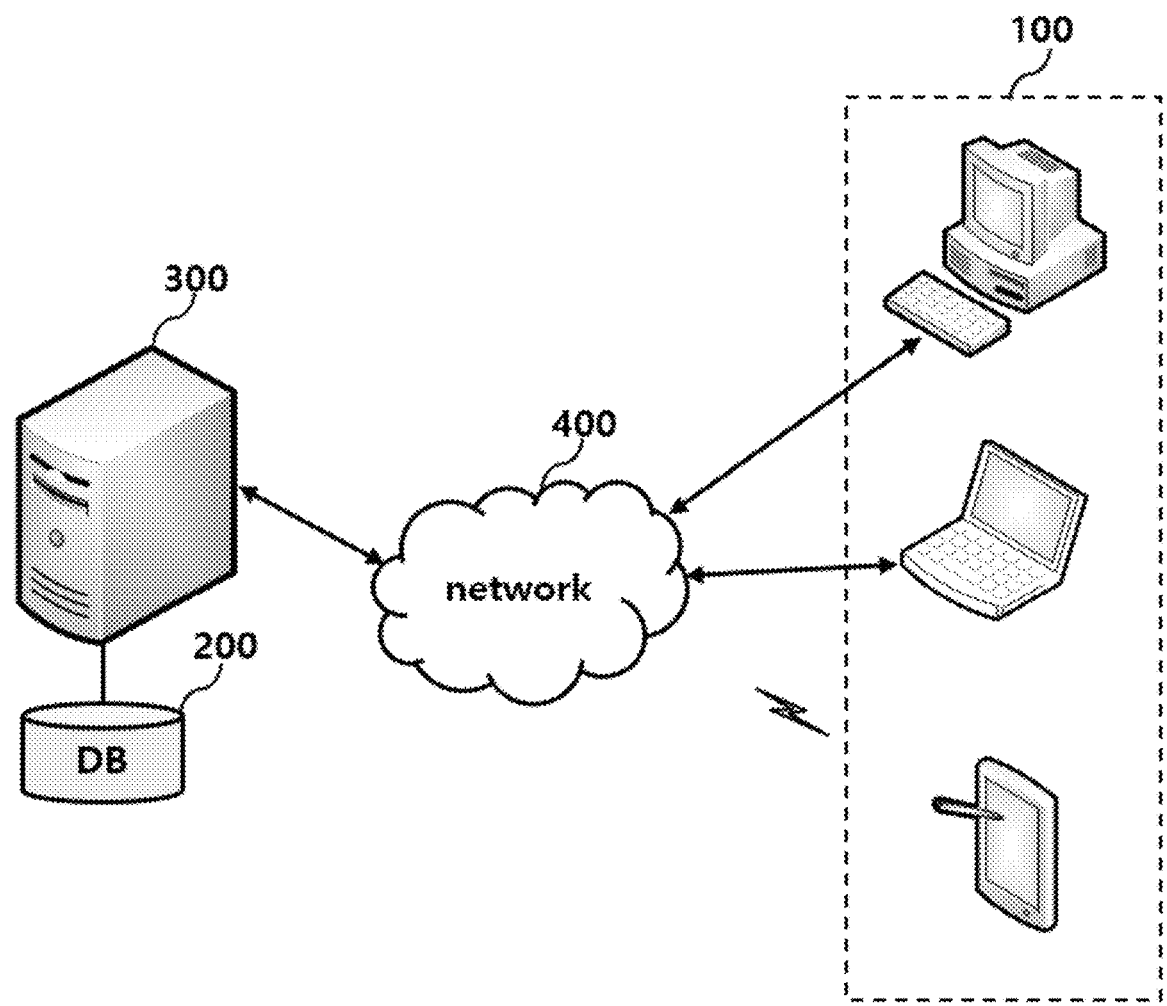
FIG. 2 is a view of a system including an apparatus for color grading and color correction according to an embodiment of the present invention.

FIG. 2 is a view of a system including an apparatus for color grading and color correction according to an embodiment of the present invention.

Referring to FIG. 2, the system includes various types of user terminals 100 corresponding to a color grading and color correction apparatus 100, a database 200, a server 300, and a network 400.

The user terminal 100 is an apparatus for performing color grading and color correction of an digital image, and includes: an image output exclusive device capable of generating and editing a digital image including a video; an image editor, an image editing device, or a computing device capable of performing a global calculation other than image generating and editing; a terminal; and a wireless terminal.

The color grading and color correction apparatus 100 according to an embodiment of the present invention which corresponds to the user terminal 100 stores in an installed manner an application module for color grading and color correction which includes computer instructions constituting a color grading and color correction method according to an embodiment of the present invention.

As various examples of the user terminal, a cellular phone, a smartphone including a wireless communication function, a PDA including a wireless communication function, a wireless modem, a mobile computer including a wireless communication function, an image capturing apparatus such as digital camera including a wireless communication function, a gaming apparatus including a wireless communication function, a music storing and playing home appliance including a wireless communication function, an Internet home appliance capable of performing wireless Internet access or browsing, or mobile units or terminals integrating and including the same functions are included, but it is not limited thereto.

The database 200 includes information of data generated according to an embodiment of the present invention. The database 200 is directly connected to the server 300 or directly connected to the user terminal 100, but it is not limited thereto. Information of data generated according to an embodiment of the present invention will be described later.

The server 300 may include a file sever, an update server, a FTP server, a web server, and a database sever, but it is not limited thereto. The server 300 stores various types of files required for updating a color grading and color correction application module stored in the user terminal 100, for example, a new patch, an expansion program and a service pack, and provides updating of the application through downloading by allowing the user terminal access thereto. In addition, the server 300 may be directly connected to the database 200 established according to an embodiment of the present invention.

The network 400 includes a wired network in a LAN, WAN form, a near field wireless network such as WiFi, Bluetooth, Zigbee, etc., and various types of cellular wireless communication networks, but it is not limited thereto.

In the color grading and color correction apparatus 100, the color grading and color correction application module that is not installed may read stored media, and may be installed in the color grading and color correction apparatus 100 by installing the media. The media may be an optical storage media, for example, a CD-ROM or DVD-ROM. In addition, the color grading and color correction application module may be provided in a binary file format downloaded from the server 300. The color grading and color correction apparatus 100 may update the application module by downloading various files from the server 300 through the network 400. The color grading and color correction apparatus 100 will be described in detail.

Figure 3:
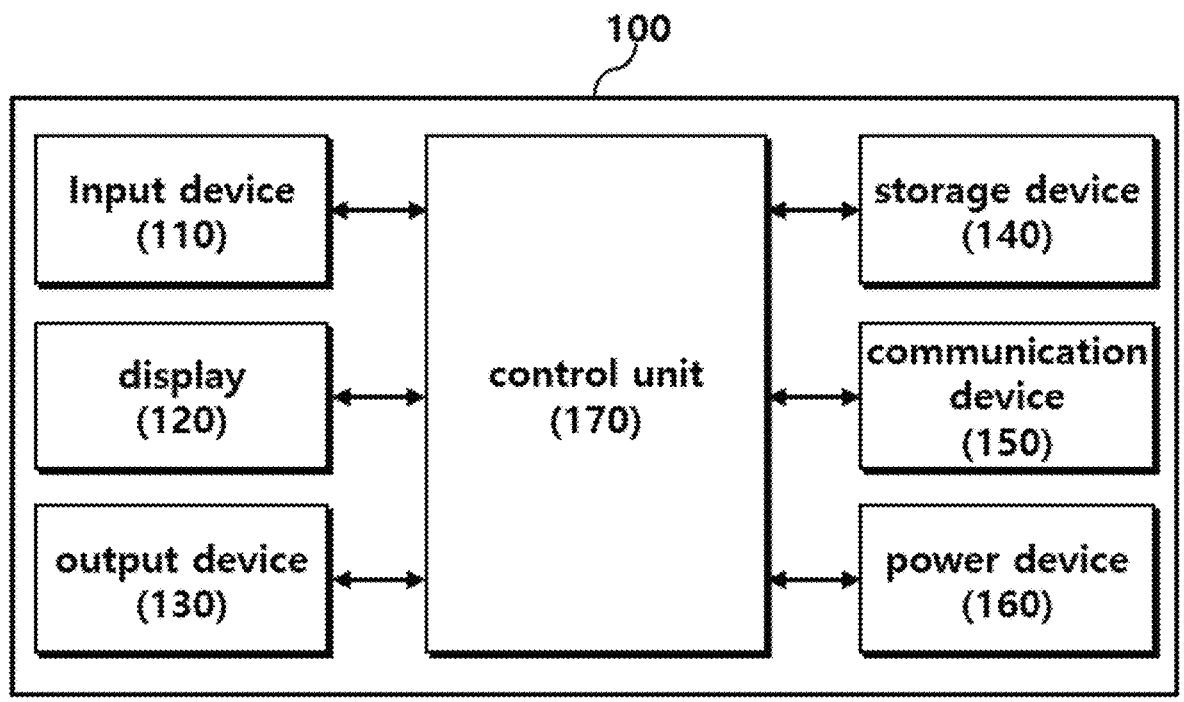
FIG. 3 is a view of a block diagram of an apparatus for color grading and color correction according to an embodiment of the present invention.

FIG. 3 is a view of a block diagram of a color grading and color correction apparatus according to an embodiment of the present invention.

Referring to FIG. 3, the color grading and color correction apparatus 100 includes an input device 110, a display 120, an output device 130, a storage device 140, a communication device 150, a power device 160, and a control unit 170.

The input device 110 may include a keyboard, a touch screen, a mouse, a stylus pen for inputting information for setting various parameters of data for color grading and color correction and a user operation environment, and a voice input device, for example, a microphone, but it is not limited thereto. The input device 110 inputs a command required for color grading and color correction by practically receiving the same from the user. Herein, color grading refers to a process for other effects that do not cause distortion, and color correction refers to a process for grading the distortion, but it is not limited thereto. The same may refer to color, tone, and color sense changing, transforming, and correction which may occur due to image processing.

The display 120 may include a cathode-ray tube (CRT) display, a liquid crystal display (LCD), a plasma display panel (PDP), a light emitting diode (LED) display, and an organic light emitting diode (OLED) display which output an editing frame for performing color grading and color correction, but it is not limited thereto.

The output device 130 may include a printer, a plotter, a beam projector, a text-to-sound (TTS) device, a speaker, and earphones, but it is not limited thereto.

The storage device 140 may have a form that is detachable/non-detachable from the color grading and color correction apparatus 100, and may be a magnetic storage device such as a magnetic tape, a magnetic drum, a floppy disk, a ZIP drive, and a hard disk drive (HDD), an electronic storage device using a flash memory such as an SD card, a USB memory, and a solid state drive (SSD), and an optical storage device such as CD-ROM drives, DVD-ROM drives, and blu-ray disc drives, but it is not limited thereto.

The communication device 150 may include a communication module in association with various types of communication networks of the wired and wireless communication network 300, for example, a Bluetooth module, a WiFi module, an Ethernet interface card, a USB module, a cellular wireless communication module, a modem, and a wireless router, but it is not limited thereto.

The power device 160 may be a power supply converting AC power to DC power, an adapter, an SMPS, a secondary battery such as a lithium-ion battery, a lead-acid battery, fuel cells, and a bio-ethanol battery, and a primary battery, but it is not limited thereto.

The control unit 170 controls each configuration component within the color grading and color correction apparatus 100 so that a color grading and color correction method according to an embodiment of the present invention is realized in practice. The control unit 170 will be described in detail.

Figure 4:
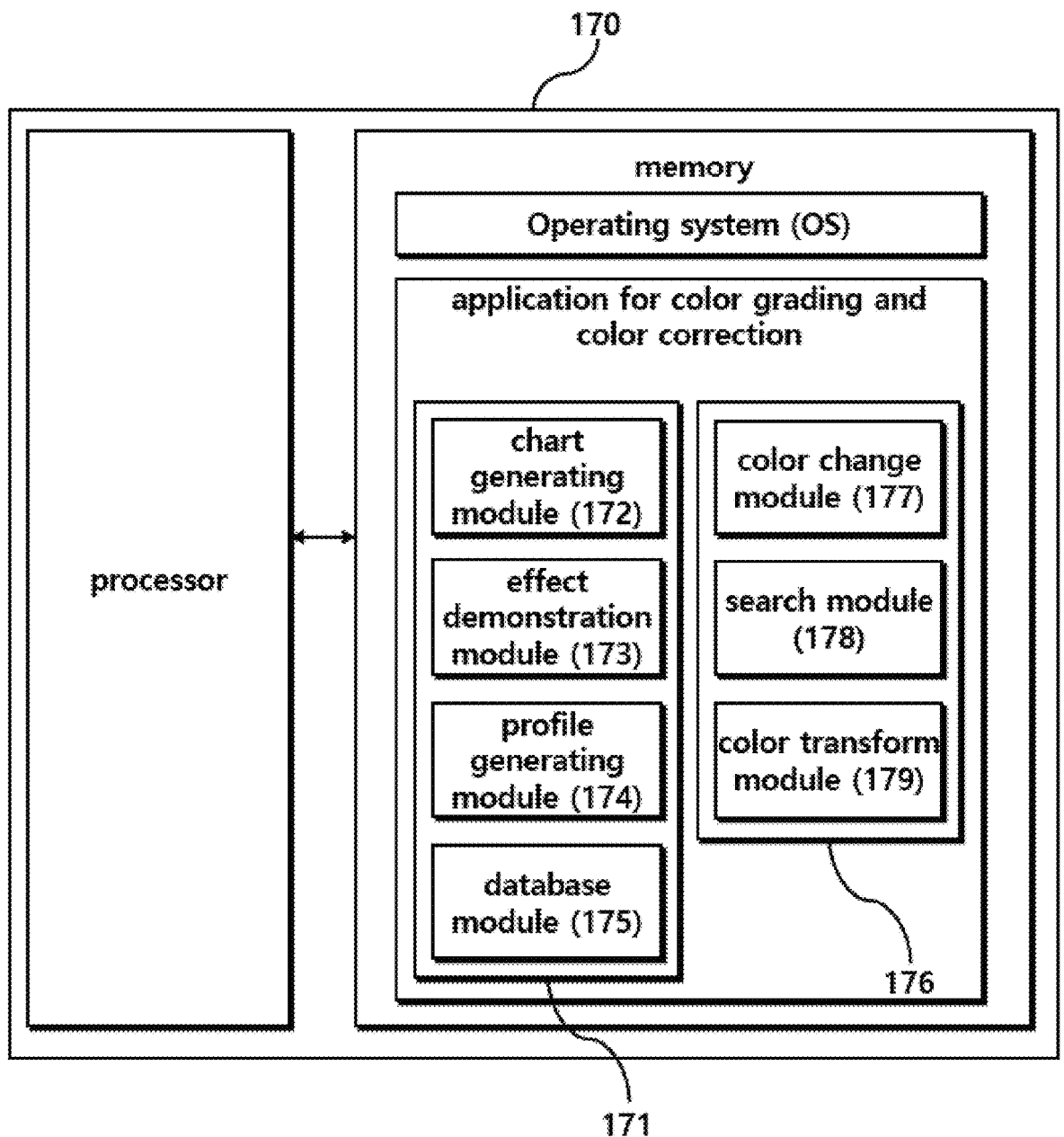
FIG. 4 is a view of a block diagram of a control unit.

FIG. 4 is a view of a block diagram of the control unit of FIG. 3.

Referring to FIG. 4, the control unit 170 includes a memory in which a processor (CPU), an operating system, and the color grading and color correction application module are stored. In the memory of the control unit 170, the color grading and color correction application module including computer instructions performing the color grading and color correction method according to an embodiment of the present invention includes a database generating unit 171, and a color correction engine 176.

In detail, the control unit 170 controls: a color grading and color correction process according to the color grading and color correction method according to an embodiment of the present invention by receiving a user input from the input device 110 of the color grading and color correction apparatus 100; a process of outputting a screen frame representing a color graded and color corrected image and a user interface to the display 120; a process of outputting, through the output device 130, the color graded and color corrected image on a surface such as paper, fabric, and plastic, which is capable of printing the color graded and color corrected image; a process of storing the color graded and color corrected image in the storage device 140; a process of receiving, through the network 400, various types of data required for color grading and color correction or transmitting the color graded and color corrected image to the server 300 or an external terminal by using the communication device 150; and a process of supplying power, through the power device 160, by using a processor (CPU), an operating system (OS), and a memory in which a document generating application module including computer instructions of the color grading and color correction method according to an embodiment of the present invention is loaded.

Referring again to FIG. 4, in the color grading and color correction apparatus 100 according to an embodiment of the present invention, the control unit 170 includes the database generating unit 171 and the color correction engine 176. In addition, the database generating unit 171 includes a chart generating module 172, an effect demonstration module 173, a profile generating module 174, and a database module 175, and the color correction engine 176 includes a color change module 177, a search module 178, and a color transform module 179.

First, the database generating unit 171 generates data of image processing results obtained by performing various types of color grading and color correction, and stores the same.

The chart generating module 172 of the database generating unit 171 generates an n color table chart (NCTC) corresponding to a look-up table including a color value represented by the above method. In addition, the effect demonstration module 173 applies image processing of color grading and color correction to a sample image. In addition, the profile generating module 174 generates a profile of a color value of an image that is transformed by the above image processing. In addition, the database module 175 establishes a database of types of color grading and color correction, and profile information in association thereto.

The color correction engine 176 applies the image processing result to a target image by using profile information of color grading and color correction selected from the stored profiles.

The color change module 177 of the color correction engine 176 changes a color value of the target image such that the color value of the target image is represented by a method of representing a color value of a combined color. In addition, the search module 178 searches for a profile in association with selected color grading and color correction to be applied to the target image in the database which is generated and stored therein. In addition, the color transform module 179 transforms the color value of the target image according to profile information of the found profile. Then, the target image to which selected color grading and color correction is applied is output.

The color grading and color correction apparatus 100 according to an embodiment of the present invention which may correspond to a computing apparatus 500 may be described in detail by using another embodiment.

Figure 5:
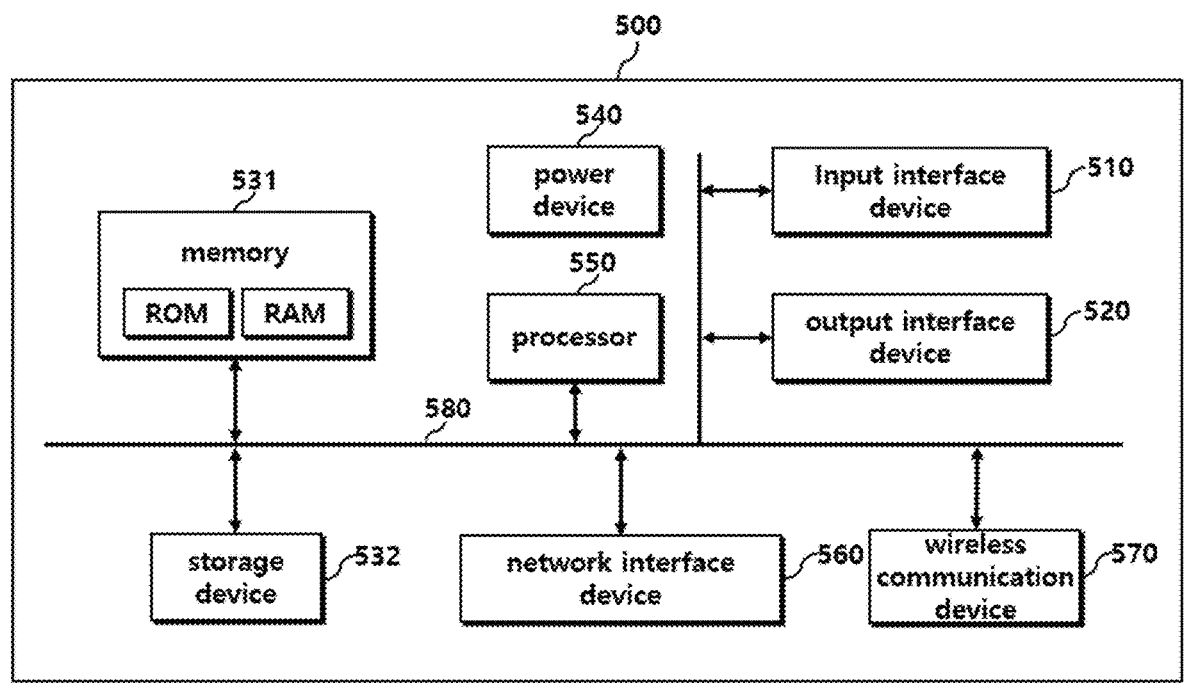
FIG. 5 is a view of a block diagram of an apparatus for color grading and color correction according to an embodiment of the present invention.

FIG. 5 is a view of a block diagram of a color grading and color correction apparatus 500 according to another embodiment of the preset invention.

Referring to FIG. 5, the color grading and color correction apparatus 500 corresponding to the computing apparatus 500 includes an input interface device 510, an output interface device 520, a memory 531, storage device 532, a power device 540, a processor 550, a network interface device 560, a wireless communication device 570, and a bus 580.

The input interface device 510 receives characters or objects required for color grading and color and color correction according to a user input. The input interface device 510 may include a keyboard, a touch screen, a mouse, a stylus pen, and a pen tablet, but it is not limited thereto.

The output interface device 520 may include a display displaying a document, and a printer printing an image. In addition, the output interface apparatus 520 may include a speaker outputting a text within a document in a voice by using a text to Speech (TTS) engine, and a head-set.

The processor 550 may execute computer instructions included in the color grading and color correction method according to an embodiment of the present invention included in the color grading and color correction application module stored in the memory 531 or the storage device 532 or both. The processor 550 may mean a central processing unit (CPU), a graphic processing unit (GPU) or an exclusive processor performing methods according to the present invention. The memory 531 and the storage device 532 may be configured with a volatile storage medium a non-volatile storage medium or both. For example, the memory 531 may be configured with a read only memory (ROM), a random access memory (RAM) or both.

The wireless communication device 570 includes a device for near filed wireless communication, wireless data communication, and wireless voice communication.

Each configuration component included in the apparatus 500 may perform communication from each other by being connected to the bus 580.

Hereinafter, the color grading and color correction method according to an embodiment of the present invention which is performed by executing computer instructions included in the color grading and color correction application module of the color grading and color correction apparatus 100 described above will be described with reference to FIGS. 3 and 6.

Figure 6:
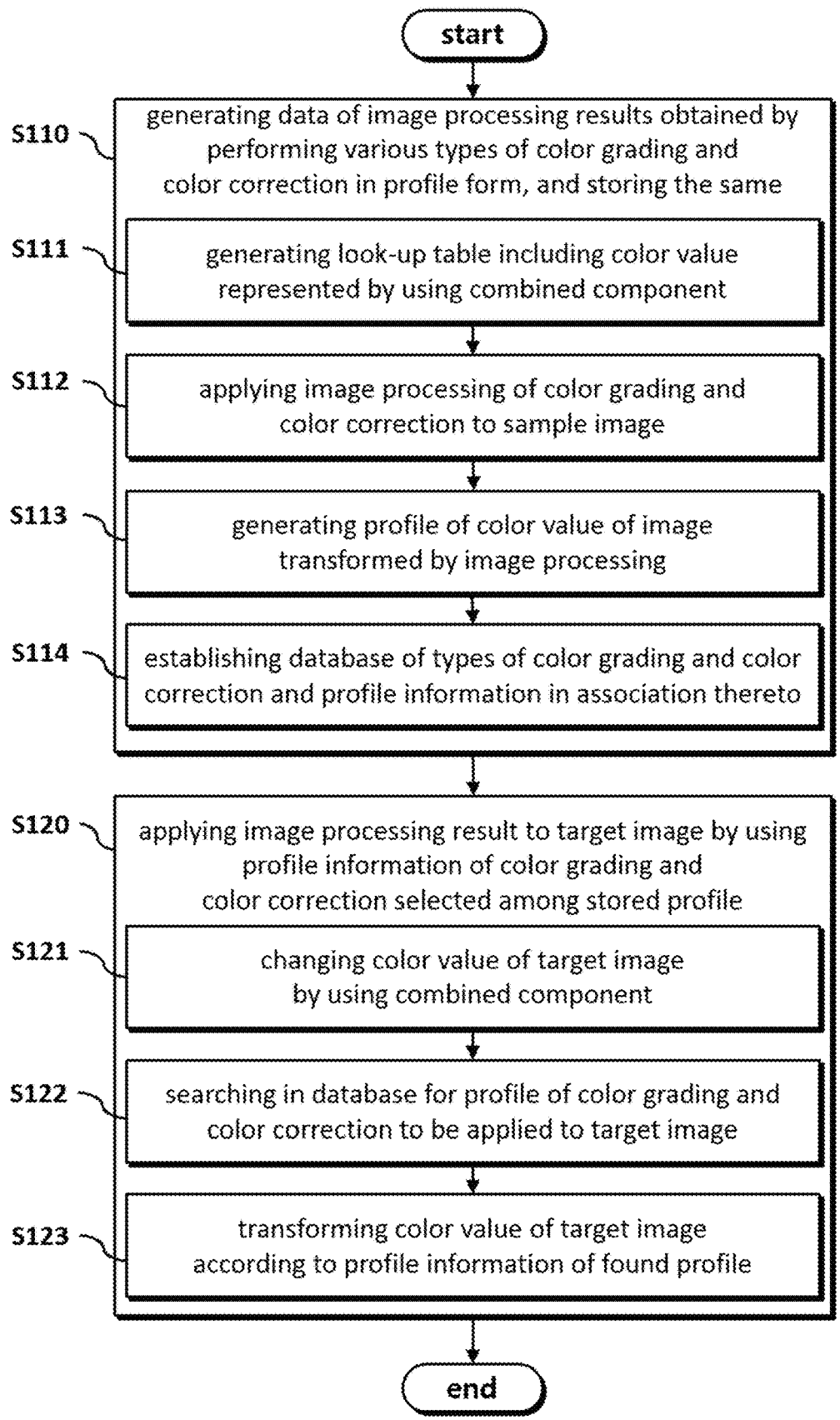
FIG. 6 is a view of a flowchart of a method of color grading and color correction according to an embodiment of the present invention.

FIG. 6 is a view of a flowchart of the color grading and color correction method according to an embodiment of the present invention.

Referring to FIGS. 3 and 6, the color grading and color correction method according to an embodiment of the present invention includes steps S110 to S123.

First, in S110, the database generating unit 710 generates data of image processing results obtained from various types of color grading and color correction, and stores the same.

Herein, various types of color grading and color correction may include level, contrast, color balance, brightness/contrast, tone)/chroma, color coincidence, color alteration, color selection, application filter, reverse, and equalization operations, but it is not limited thereto. In addition, generating data includes representing in a numerical value a relation how a numerical value of a color value represented in a color model is changed after performing image processing according to the above image processing results.

FIGS. 7A and 7B are views of an example showing a combined component of an RGB model according to an embodiment of the present invention.

Referring to FIGS. 7A and 7B, in an RGB model, a color where a numerical value of an R component is represented as 64, a numerical value of a G component is represented as 128, and a numerical value of a B component is represented as 192 is shown in 7A. According to a conventional method, image processing is performed where a color value of each component represented in an RGB model is adjusted. Accordingly, a color that is visually shown to the user through the output device such as display or printer as a numerical value change result of each component according to the conventional image processing method is outside the range expected by the user in many cases. This is because a color of each component is independently and uniformly adjusted.

A method of representing a color value according to an embodiment of the present invention uses a combined component generated by combining color components according to a color model on the basis of a greatest common divisor principle. The above combination is performed by combining, within a common numerical value range, color components having a color value of a common numerical value range in each color component.

Referring again FIGS. 7A and 7B, in an RGB model, a color where a numerical value of an R component is represented as 64, a numerical value of a G component is represented as 128, and a numerical value of a B component is represented as 192 and which is represented in a combined component is shown in 7B. According to a greatest common divisor principle, for 64 that corresponds to a common numerical value range in each of R, G, and B color components, an RGB combined component by R=G=B=64 may be set.

In detail, RGB: 64 is calculated by 64−0. By the same method, a GB combined component by G=B=64 may be set. In detail, GB: 64 is calculated by 128−64. In addition, a G component that is the remaining color component may be set. In detail, G: 64 is calculated by 192−128. Among other RGB components, when three components do not have a common numerical value range, for example, in case of R: 0, G: 128, and B: 192, a combined component may be set as RGB: 0, GB: 128, and B: 64. Alternatively, when two components do not have a common numerical value range, for example, in case of R: 0, G: 0, and B: 192, a combined component may be set as RGB: 0, GB: 0, and B: 192. In other words, the color value representing method according to an embodiment of the present invention represents a color of an image pixel by using a combined component generated by combining a plurality of color components, and color components remained after the combination. Hereinafter, detailed steps constituting S110 will be described.

S110 includes steps S111 to S114.

In S111, the chart generating module 172 generates an n color table chart (NCTC) corresponding to a look-up table including a color value represented in the above method.

The chart generating module 172 generates, in an RGB color model, seven charts for an RGB combined component in which three colors are combined by using red, green, and blue color components, for RG, GB, and BR combined components in which two color components are combined, and for each of red, green, and blue components.

FIG. 8 is a view of an n color table chart of an RGB model according to an embodiment of the present invention.

Referring to FIG. 8, a combined component that may be generated by three color components in an RGB model is shown. Herein, an RGB combined component generated by combining color components having a numerical value of 50% in comparison with a maximum numerical value is shown as a representative example. Referring to FIG. 8, comparing with a conventional RGB model, color components constituting all colors are expanded in factors that are represented in seven combined components. Accordingly, when a color is represented by using a combined factor according to an embodiment of the present invention, a color changed due to color grading and color correction may be precisely represented in comparison with a conventional RGB model.

Further, a color value of a combined component according to an embodiment of the present invention may be represented in a color model including an RGB color model and a CMYK color model.

An RGB model is an additive color mixing color model in which brightness increases as colors are mixed, and a CMYK model is a subtractive color mixing color model in which brightness decreases as colors are mixed.

In a CMYK color model represented by using abbreviations of cyan, magenta, yellow, and black, brightness decreases and becomes dark as colors are added since the CMYK color model uses a color implementation principle based on an ink. This is because, as colors are combined, an amount of light decreases.

The chart generating module 172 generates in a CMYK color model 15 charts for a CMYK combined component in which four color components of C, M, Y, and K are combined, for CMY, CMK, CYK, and MYK combined components in which three colors are combined, for CM, CY, CK, MY, MK, and YK combined components in which two colors are combined, and for each of C, M, Y, and K color components.

Figures 9, 10:
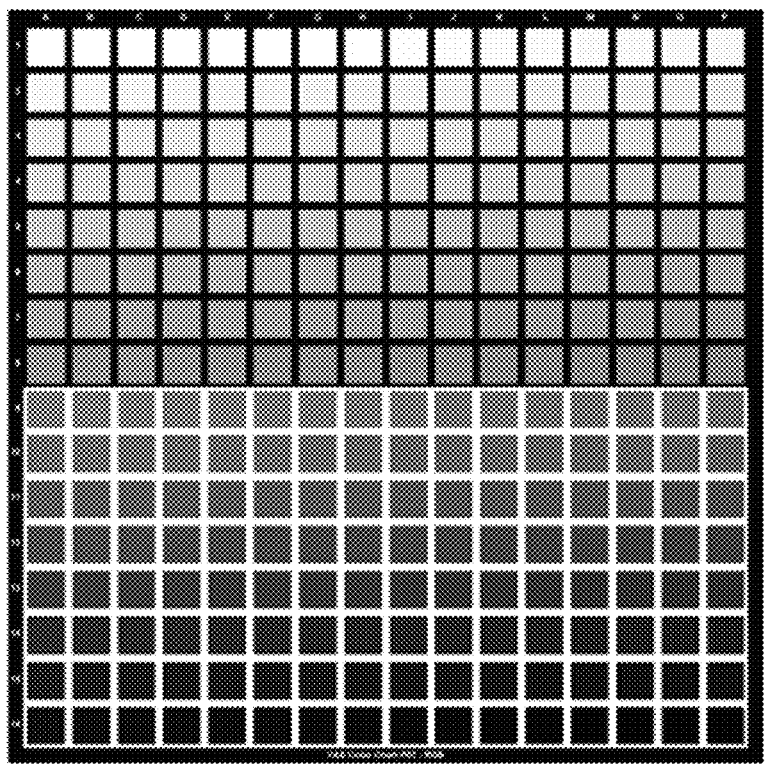
FIG. 9 is a view of an n color table chart of a CMYK model according to an embodiment of the present invention.
FIG. 10 is a view of an example of an RGB patch of an RGB model according to an embodiment of the present invention.

FIG. 9 is a view of an n color table chart of a CMYK model according to an embodiment of the present invention.

Referring to FIG. 9, combined components that may be generated by using four color components in a CMYK model are shown. Herein, a combined component including a K component and generated by combining color components having a numerical value of 50% in comparison with a maximum numerical value is shown as a representative example.

A CMYK color model has a color area that may be represented smaller than an RGB color model, but all output work that are represented by ink such as printing output works, etc. use the CMYK color model. Since there are many cases where a practical printed color differs from a color checked in a display, in a color representation in a printing output such as poster, brochure, pamphlet, portfolio, etc., a CMYK color model is used.

A chart generated in accordance with the color model includes a corresponding color distribution chart of a combined component. A look-up table of an RGB color model according to an embodiment of the present invention includes by charts a color distribution chart configured with 256 patches that stepwisely represent a combined color according to a numerical value of the combined component.

A look-up table of an RGB color model according to an embodiment of the present invention includes a color distribution chart configured with 100 patches for each chart which stepwisely represent a combined color according to a numerical value of the combined component.

FIG. 10 is a view showing an example of an RGB patch of an RGB model according to an embodiment of the present invention.

Referring to FIG. 10, a patch where numerical values of an RGB combined component is 1 to 255 is stepwisely shown.

Figure 11:
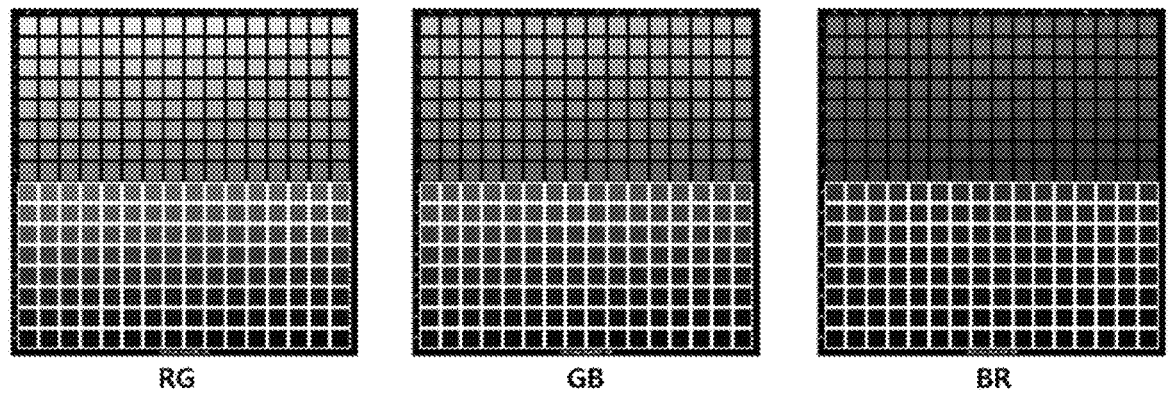
FIG. 11 is a view of an example of RG, BG, and BR patches of an RGB model according to an embodiment of the present invention.

FIG. 11 is a view of an example of RG, BG, and BR patches of an RGB model according to an embodiment of the present invention.

Referring to FIG. 11, a patch where numerical values of RG, GB, and BR combined components are 1 to 255 is stepwisely shown.

Figure 12:
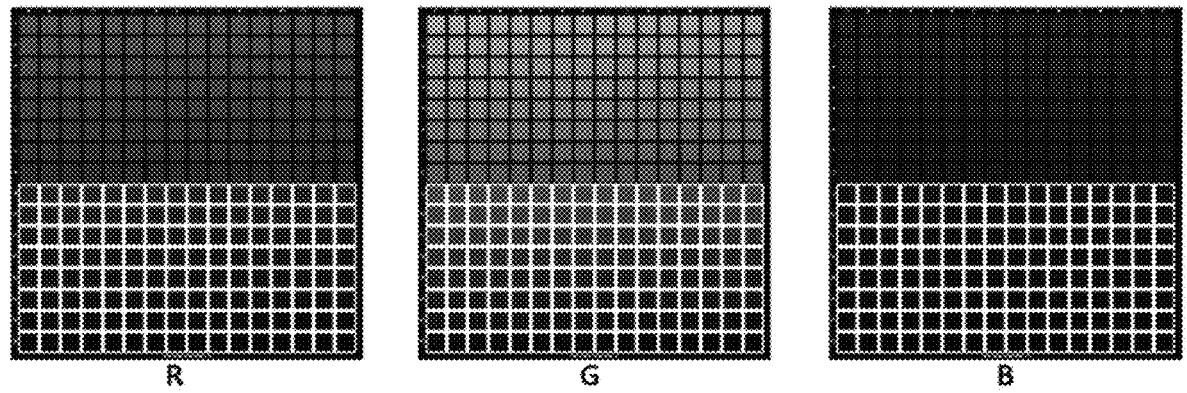
FIG. 12 is a view of an example of R, G, and B patches an RGB model according to an embodiment of the present invention.

FIG. 12 is a view showing an example of R, G, and B patches of an RGB model according to an embodiment of the present invention.

Referring to FIG. 12, a patch where numerical values of R, G, and B color components are 1 to 255 is stepwisely shown.

A patch value included in each chart becomes a basis of representing a color that varies according to color grading and color correction according to an embodiment of the present invention.

Then, in S112, the effect demonstration module 173 applies image processing of color grading and color correction to a sample image. In S112, various types of color grading and color correction which are described are performed. Further, a single operation or at least two operations of various combinations are sequentially performed. Then, in order to quantify results of conventional effects, for example, noise, render, messy line, sharpen effect, pencil drawing effect, stylize, artistic effect, distortion, texture effect, pixelize effect, blur effect, and various other effects implemented by a filter provided from third parities, image processing by various filters may be applied to the sample image.

Then, in S113, the profile generating module 174 generate a profile of a color value of an image that is transformed by the above image processing. Each profile has own unique number for systematic management.

Then, in S114, the database module 175 establishes a database of types of performed color grading and color correction and profile information in association thereto. Herein, the profile information includes a color value of an NCTC, a color value transformed by digital image processing according to an embedment of the present invention, names of effects implemented by other image processing, an effect phase, and types of color models. Hereinafter, applying an effect obtained by performing image processing to the target image by using the established database will be described.

First, in S120, the color correction engine 176 applies a result obtained by performing the image processing to the target image by using profile information of color grading and color correction selected among the stored profile.

In detail, S120 includes steps S121 to S123.

First, in S121, the color change module 177 changes a color value of the target image such that the color value of the target image is represented by a color value of the combined color. According to the result of S121, a color of each pixel of the target image is represented as a color represented by a patch according to an embodiment of the present invention, and a practical color of the pixel may be represented by adding numerical values represented by the patch.

Then, in S122, the search module 178 searches for a profile corresponding to the selected color grading and color correction to be applied in the database storing the profiles are as data. For the same, various methods practically used in a database management may be used. In other words, the user may search for a profile by using an effect of image processing to be used, a profile number, a color value, and a keyword of an application phase.

Finally, in S123, the color transform module 179 transforms the color value of the target image according to profile information of the found profile.

In an RGB color model, the color transform module 179 transforms the color value of the target image by adding at least one transformed color value in a group including a color value transformed from a color value of a red, green, and blue (R=G=B) combined component, a color value transformed from any one combined component among RG, GB, and BR (R=G/G=B/B=R) combined components, and a color value transformed from a color value of any one color component of red, green, and blue components. In other words, according to an embodiment of the present invention, the color transform module 179 calculates a transformed color value for each pixel by transforming the color value for each combined components and adding the transformed color values.

A single profile includes information of at least one image processing. Accordingly, the user may process a plurality of image processing effects by using a single process even though the color value of the target image is transformed according to a single piece of found profile information.

Then, the target image to which the finally selected color grading and color correction is applied is output.

Herein, the target image is a file having a format in which color information is not changed by image processing according to an embodiment of the present invention. For example, a target image of a PNG, TIFF form may be used.

The color grading and color correction method according to an embodiment of the present invention may be implemented in the form of program instructions executable through diverse computing means and may be recorded in computer readable media. The computer readable media may include independently or associatively program instructions, data files, data structures, and so on. Program instructions recorded in the media may be specially designed and configured for embodiments, or may be generally known by those skilled in the computer software art.

Computer readable recording media may include magnetic media such as hard disks and floppy disks, optical media such as CD-ROMs and DVDs, magneto-optical media such as floptical disks, and hardware units, such as ROM, RAM, flash memory, and so on, which are intentionally formed to store and perform program instructions. Program instructions may include high-class language codes executable by computers using interpreters, as well as machine language codes likely made by compilers. The hardware units may be configured to function as one or more software modules for performing operations according to embodiments of the present disclosure, and vice versa.

As described above, according to an embodiment of the present invention, the color grading and color correction method and the color grading and color correction apparatus using the same may provide a combined color that becomes an practical subject to be adjusted by using a combined color component rather than using a single color component according to a color model, and perform color grading and color correction on the basis of a combined color component.

In addition, the method and apparatus may perform color grading and color correction that provides combined effects by using a single process.

In addition, the method and apparatus stores results of image processing providing various effect in a database, selects and executes a desired effect in the database by searching, and thus reconstructs the effect to be implemented by performing color grading and color correction by quantifying the same.

In addition, the method and apparatus may provide various effects by using a single process and damage to color information may be prevented.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of color grading and color correction, the method comprising:
   generating data of image processing results obtained by performing color grading and color correction in a profile form, and storing the same; and
   applying the image processing result to a target image by using profile information of color grading and color correction selected from the stored profiles,
   wherein representing a color value is performed by using a combined component generated by combining color components according to a color model based on a greatest common divisor principle.

2. The method of claim 1, wherein the generating of the data includes generating an n color table chart (NCTC) corresponding to a look-up table including the color value represented by using the combined component.

3. The method of claim 2, wherein the generating of the data and storing the same further includes:
   applying image processing of color grading and color correction to a sample image;
   generating a profile of a color value of an image transformed by the image processing; and
   establishing a database of the types of the color grading and color correction, and profile information in association thereto.

4. The method of claim 3, wherein the profile information includes a color value transformed by a color value of the NCTC and by the image processing.

5. The method of claim of 1, wherein the applying to the target image includes:
   changing a color value of the target image such that the color value of the target image is represented by using a color value of the combined component;
   searching in the database for a profile in association with the selected color grading and color correction that is to be applied to the target image and which is generated and stored as the data; and
   obtaining the target image to which the selected color grading and color correction is applied by transforming the color value of the target image according to profile information of the found profile.

6. The method of claim 1, wherein in the representing of the color value, a color of an image pixel is represented by using a combined component obtained by combining a plurality of color components, and a color component that is remained afterward.

7. The method of claim 1, wherein the combination is performed by combining from each other color components having a color value of a common numeral range in each color component.

8. The method of claim 1, wherein the color value of the combination component is represented in a color model including an RGB color model and a CMYK color model.

9. The method of claim 6, wherein in the RGB color model, seven charts are used:
  for an RGB combined component in which three color components of an R component, a G component, and a B component are combined;
  for an RG combined component, a GB combined component, and a BR combined component in which two color components are combined; and
  for each color component of a red component, a green component, and a blue component.

10. The method of claim 6, wherein in the CMYK color model, 15 charts are used:
  for a CMYK combined component in which four color components of C, M, Y, and K components are combined;
  for CMY, CMK, CYK, and MYK combined components in which three color components are combined;
  for CM, CY, CK, MY, MK, and YK combined components in which two color components are combined; and
  for each color component of a cyan component, a magenta component, a yellow component, and a black component.

11. The method of claim 7, wherein each chart includes 256 patches stepwisely representing a color according to a value of a color component constituting a combined component in association with each chart.

12. The method of claim 8, wherein each chart includes 100 patches stepwisely representing a color according to a value of a color component constituting a combined component in association with each chart.

13. The method of claim 3, wherein the transformed color value of the target image is generated by adding at least one color value from a group including a transformed color value by an RGB combined component, a transformed color value by any one of RG, GB, and BR combined components, and a transformed color value by any one of remaining red, green, and blue components.

14. The method of claim 1, wherein the target image is a file having a format in which color information is not changed by the image processing.

* * * * *